(12) United States Patent
Schmidt et al.

(10) Patent No.: US 9,108,746 B2
(45) Date of Patent: Aug. 18, 2015

(54) METHOD OF PROTECTING AN AIRCRAFT LANDING GEAR WHILE THE AIRCRAFT IS BEING TOWED, AND PIN FOR COUPLING A TOWING BAR TO AN ORIENTABLE LOWER PART OF A LANDING GEAR

(75) Inventors: Robert Kyle Schmidt, Cheltenham (GB); Jean-Luc Alleau, Orcemont (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 329 days.

(21) Appl. No.: 13/582,667

(22) PCT Filed: Mar. 31, 2011

(86) PCT No.: PCT/EP2011/001613
§ 371 (c)(1),
(2), (4) Date: Sep. 4, 2012

(87) PCT Pub. No.: WO2011/120693
PCT Pub. Date: Oct. 6, 2011

(65) Prior Publication Data
US 2012/0326894 A1  Dec. 27, 2012

(30) Foreign Application Priority Data
Mar. 31, 2010  (FR) ...................................... 10 52379

(51) Int. Cl.
G08B 21/00 (2006.01)
B64F 1/22 (2006.01)
B64C 25/50 (2006.01)

(52) U.S. Cl.
CPC ................. *B64F 1/224* (2013.01); *B64C 25/50* (2013.01)

(58) Field of Classification Search
None
See application file for complete search history.

(56) References Cited

U.S. PATENT DOCUMENTS

| | | | |
|---|---|---|---|
| 3,709,522 A | 1/1973 | Olson | |
| 4,113,041 A * | 9/1978 | Birkeholm | 180/14.1 |
| 5,048,625 A * | 9/1991 | Birkeholm | 180/14.6 |
| 5,941,614 A * | 8/1999 | Gallery et al. | 303/192 |
| 2003/0095854 A1 * | 5/2003 | Abela | 414/426 |
| 2007/0194557 A1 * | 8/2007 | Caporali et al. | 280/493 |
| 2011/0224845 A1 * | 9/2011 | Perry et al. | 701/2 |
| 2012/0310482 A1 * | 12/2012 | Decoux et al. | 701/41 |
| 2013/0081890 A1 * | 4/2013 | Levy et al. | 180/167 |

FOREIGN PATENT DOCUMENTS

| | | |
|---|---|---|
| DE | 36 42 044 A1 | 6/1988 |
| EP | 0 335 611 A1 | 10/1989 |
| GB | 2 287 681 A | 9/1995 |
| WO | 2006/067442 A1 | 6/2006 |

* cited by examiner

*Primary Examiner* — Brian Zimmerman
*Assistant Examiner* — Kevin Lau
(74) *Attorney, Agent, or Firm* — Sughrue Mion, PLLC

(57) ABSTRACT

A method of protecting an aircraft undercarriage (1) while it is being towed by means of a tow bar (13) hitched to a steerable bottom portion of the undercarriage, the method including the step of generating an alarm when a towing force imposed by the tow bar on the undercarriage reaches or exceeds a predetermined force threshold. The threshold is caused to vary as a function of an orientation of the steerable bottom portion of the undercarriage.

12 Claims, 1 Drawing Sheet

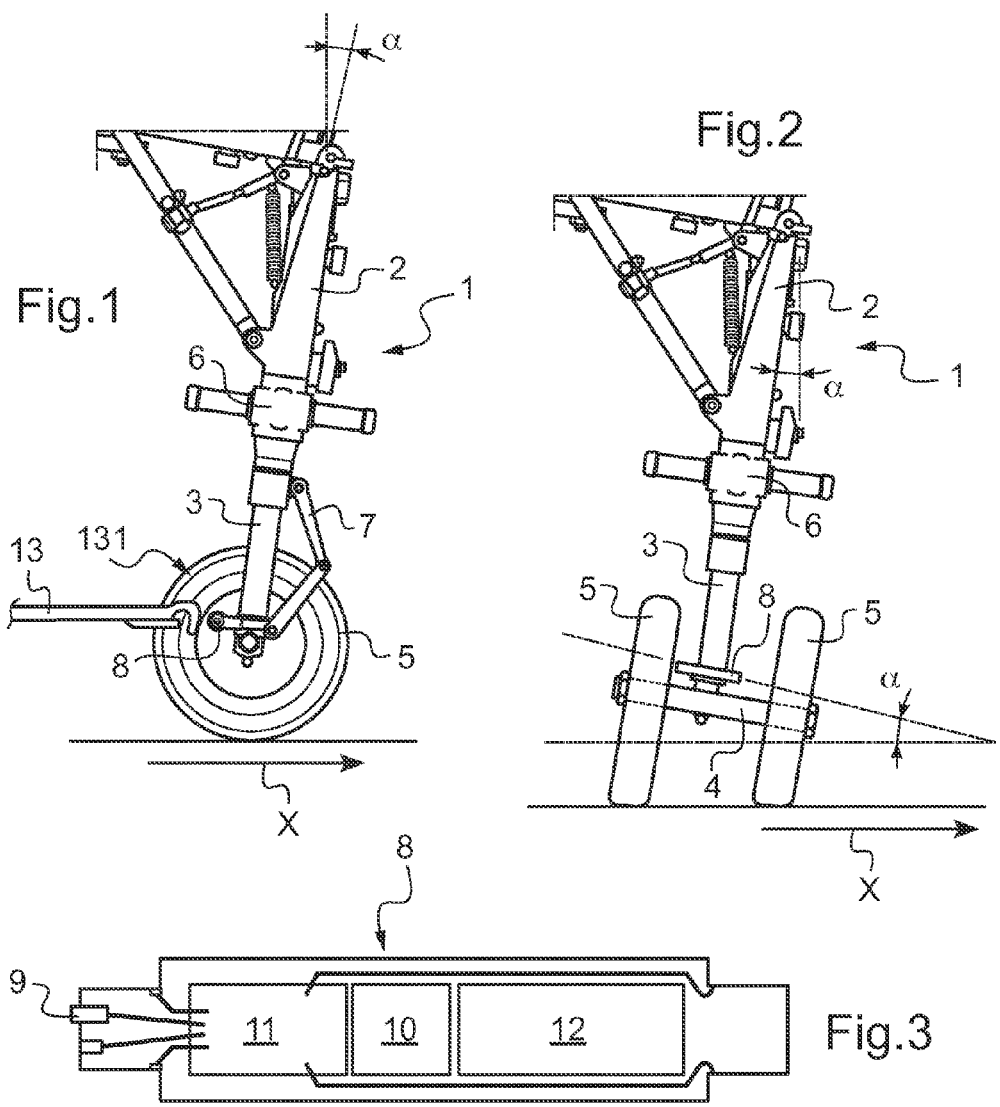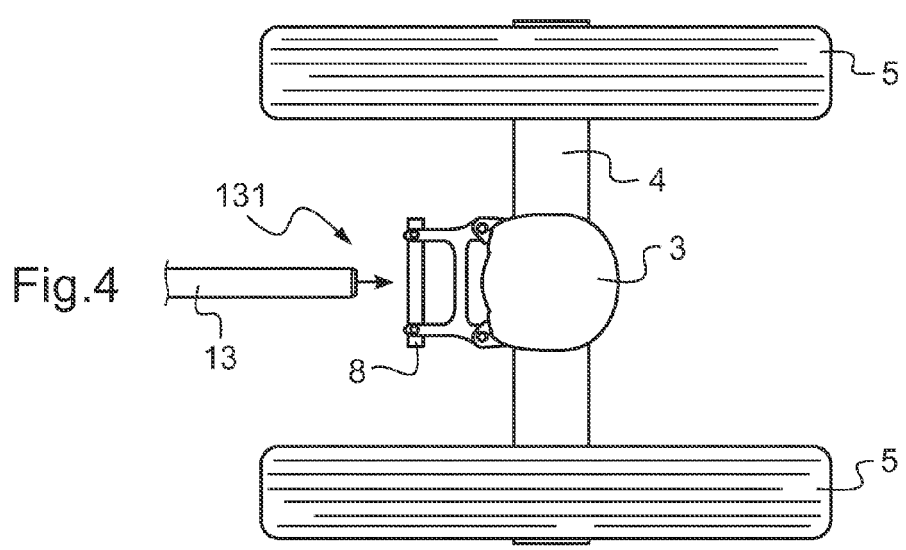

METHOD OF PROTECTING AN AIRCRAFT LANDING GEAR WHILE THE AIRCRAFT IS BEING TOWED, AND PIN FOR COUPLING A TOWING BAR TO AN ORIENTABLE LOWER PART OF A LANDING GEAR

CROSS REFERENCE TO RELATED APPLICATIONS

This application is a National Stage of International Application No. PCT/EP2011/001613 filed on Mar. 31, 2011, which claims priority from French Patent Application No. 10 52379, filed on Mar. 31, 2010, the contents of all of which are incorporated herein by reference in their entirety.

The present invention relates to a method of protecting an aircraft undercarriage while it is being towed, and to a pin for hitching a tow bar to a steerable bottom portion of an undercarriage.

BACKGROUND OF THE INVENTION

The invention relates to towing aircraft on the ground, by means of towing devices designed to hitch the bottom portion of an undercarriage of the aircraft to a towing vehicle. Such towing devices are usually in the form of drawbars having one end mounted to the rear of a towing vehicle and the other end hitched to the bottom portion of the nose undercarriage of the aircraft. Generally, the drawbar is hitched to the undercarriage by inserting the end of the bar between lugs on the sliding rod of the nose undercarriage, close to the axle carrying the wheels of the undercarriage. The end of the drawbar is then secured thereto via a connecting pin referred to as a towing pin. The drawbar transmits high levels of traction and bending forces to the undercarriage, particularly when the aircraft is heavily loaded. The level of force transmitted to the undercarriage is also dependent on changes of direction imparted by the towing vehicle: the force threshold that can be supported by the undercarriage is much greater when the wheels of the undercarriage are substantially parallel to the longitudinal axis of the aircraft than when the wheels are oriented in a direction that is oblique relative to the longitudinal axis of the aircraft.

In order to avoid the drawbar damaging the undercarriage by transmitting forces that are too high thereto, it is known to use the towing pin as a mechanical fuse, by weakening it locally so that it breaks as soon as a predetermined force threshold is reached. Nevertheless, that solution is not without drawbacks. Firstly, in order to guarantee that the pin will break when the situation requires it, in particular when the steering angle of the wheels of the undercarriage is considerable, it is prudent to incorporate a large safety margin when determining its breaking threshold, which leads to pins breaking frequently, and sometimes unnecessarily. Secondly, breaking the pin does not constitute a response that is optimal in terms of safety, since even though it does indeed break the connection between the aircraft and the towing vehicle, thereby terminating the application of excessive forces to the undercarriage, it nevertheless does not necessarily cause the aircraft to come to rest immediately, so the aircraft is in danger of continuing to travel on the ground under its own momentum, as a result of inertia.

OBJECT OF THE INVENTION

The object of the invention is to remedy the above-mentioned drawbacks by proposing an improved method of protecting airplane undercarriages while they are being towed.

SUMMARY OF THE INVENTION

To this end, the invention provides a method of protecting an aircraft undercarriage while it is being towed by means of a tow bar hitched to a steerable bottom portion of the undercarriage, the method comprising the step of generating an alarm when a towing force imposed by the tow bar on the undercarriage reaches or exceeds a predetermined force threshold. According to the invention, said threshold is caused to vary as a function of the orientation of the steerable bottom portion of the undercarriage.

With the method of the invention, account is also taken of the criterion concerning the orientation of the bottom portion of the undercarriage, and thus the orientation of the wheels of the undercarriage. It is thus possible to select very accurately the force threshold beyond which there is a risk of damaging the undercarriage as a function of the orientation of the wheels. As mentioned above, it is found that undercarriages have a force threshold that is much greater when the wheels are in alignment with the longitudinal axis of the aircraft during towing than when the wheels are inclined relative to said axis. Taking account of the orientation of the wheels thus makes it possible to trigger an alarm concerning the threshold being exceeded only when that is actually necessary, and to do so in a manner that is much more reliable and accurate than in previous solutions.

The invention also provides a pin for hitching a tow bar to the steerable bottom portion of an undercarriage, the pin comprising:
  means for measuring the forces to which the pin is subjected;
  means for measuring the angle of inclination of the pin relative to the horizontal;
  means for calculating a force threshold as a function of the orientation of the bottom portion of the undercarriage as deduced from the angle of inclination of the pin; and
  means for comparing a measured force with a force threshold and for generating an alarm if the measured forces reach or exceed a force threshold.

The towing pin is particularly suitable for implementing the method of the invention. Use is advantageously made of the fact that it is possible from the measured orientation of the pin relative to the horizontal to deduce the orientation of the wheels of the undercarriage in the special circumstance of undercarriages that present a castor angle, i.e. undercarriages in which the pivot axis of the bottom portion is inclined relative to the vertical. By fitting the towing pin with appropriate instruments, it is thus possible from the pin on its own to determine both the orientation of the wheels of the undercarriage and the force threshold (as applied to the pin and thus transmitted to the undercarriage) that can be accepted by the undercarriage in order to avoid damage thereto, as a function of the orientation of the wheels. As a result, the invention makes it possible to implement the method of protecting the undercarriage without any need to fit the undercarriage in question with additional measurement or calculation means, since all of the measurements and all of the calculations can be performed on the towing pin, which is easily changed and which remains with the towing equipment on the ground. Furthermore, the alarm system makes it possible to alert the towing operator so as to modify towing conditions and thus avoid reaching the threshold stress that would lead automatically to the pin breaking, and thus needing to be replaced.

Other characteristics and advantages of the invention appear from the description given below of an embodiment of the invention.

BRIEF DESCRIPTION OF THE DRAWINGS

Reference is made to the accompanying drawing, in which:

FIG. 1 is a diagrammatic side view of the bottom portion of an aircraft nose undercarriage in which the wheels are parallel to the longitudinal axis of the aircraft;

FIG. 2 is a diagrammatic side view of the bottom portion of the FIG. 1 aircraft nose undercarriage, with the wheels shown turned through a given angle relative to the longitudinal axis of the aircraft;

FIG. 3 is a diagrammatic view of the towing pin fitted with instruments in accordance with the invention for the drawbar hitching the undercarriage to a towing vehicle; and FIG. 4 is a diagrammatic plan view of the undercarriage being hitched to the tow bar.

DETAILED DESCRIPTION OF THE INVENTION

With reference to FIG. 1, an aircraft nosewheel undercarriage 1 comprises a strut 2 connected directly to the structure of the aircraft, and having a rod 3 mounted to slide telescopically therein so as to co-operate with the strut 2 to form a shock absorber. The rod 3 carries an axle 4 at its bottom end, with two wheels 5 mounted thereon. The strut 2 has a steering member comprising a collar 6 rotatably mounted about the strut 2. In this example, the undercarriage presents a castor angle α that is substantially equal to 10°.

When not in a towing situation, the collar 6 is operated by steering actuators: the collar is connected to the rod 3 by a steering scissors linkage 7 having two branches that are hinged together in such a manner that the angular position of the rod 3 is determined by the angular position of the collar 6. In order to steer the wheels 5, it suffices to control the steering actuators so as to turn the collar 6, thereby turning the rod 3 by means of the steering linkage 7.

When the aircraft is being towed on the ground, steering control over the wheels 5 is deactivated. As shown in FIG. 4, a tow bar 13 is coupled at one of its ends to a towing vehicle (not shown) and at its other end 131 to a towing pin 8 that is fastened to the bottom portion of the sliding rod 3 close to the axle 4, as shown in FIG. 4. The towing vehicle moves the tow bar 13, which in turn moves the undercarriage 1 along a given path on the ground. In FIG. 1, the wheels 5 of the undercarriage 1 are shown parallel to the longitudinal axis X of the aircraft.

FIG. 2 shows the same undercarriage 1 as in FIG. 1, but with the wheels 5 turned through 90° relative to their orientation in FIG. 1. With the wheels in such an extreme orientation, it is found that the load that can be supported by the undercarriage 1 without damage is about half the load that can be supported by the same undercarriage while the wheels are parallel to the longitudinal axis X, as in FIG. 1.

Furthermore, given the castor angle, it can be understood that the angle of inclination of the pin 8 relative to the horizontal is directly linked to the orientation of the wheels 5 of the undercarriage. The angle made by the pin 8 relative to the horizontal is equal to the castor angle α of the sliding rod 3 relative to the vertical when the wheels 5 are oriented at 90°. Thus, the angle made by the pin relative to the horizontal varies over the range 0° when the wheels are in alignment on the longitudinal axis of the aircraft to an angle equal to the castor angle of the undercarriage when the wheels are oriented at 90°.

As shown in FIG. 3, the towing pin 8 has been modified in accordance with the invention so as to include various components, including:

- means for measuring the forces to which the pin is subjected, here one or more strain gauges 9;
- means for measuring the angle of inclination of the pin 8 relative to the horizontal, here an accelerometer 10, and more particularly a three-axis accelerometer;
- means for calculating a force threshold as a function of the orientation of the bottom portion of the undercarriage 1 as deduced from the angle of inclination of the pin 8; and
- means for comparing the forces measured with the force threshold in order to generate an alarm if the measured forces reach or exceed the force thresholds.

The means for performing calculations, comparisons, and triggering alarms in this example are grouped together in a single unit 11 made up of conventional electronic components.

A battery 12 is also provided that serves to provide the above-mentioned components with the ability to operate for a sufficient length of time.

It is more advantageous to use a three-axis accelerometer instead of an inclinometer (only one axis), since a three-axis accelerometer also makes it possible to estimate the angle of inclination of the undercarriage as a result of the ground not being level, should that be the case. Using a three-axis accelerometer also makes it possible to obtain data that can be used for other functions: although determining the orientation of the wheels by the control system of the aircraft requires a highly filtered accelerometer signal, the accelerometer signal with little or no filtering may also be used for determining the dynamic response of the non-suspended mass of the undercarriage.

The method of protecting the undercarriage 1 of the invention as implemented by the towing pin 8 fitted with in this way with instruments operates as follows: during towing, the pin 8 presents an angle inclination relative to the horizontal that varies as a function of the changes of direction imparted by the towing vehicle and transmitted to the pin by the tow bar. Variation in the angle of inclination is measured by the accelerometer 10, the level of stress applied to the pin is measured by the strain gauge 9, and then, as a function of this pair of values, the calculation means 11 calculate the threshold load that the undercarriage can support for a given angle of inclination of the wheels. The comparator means 11 compare this threshold value with the measured value and they trigger an alarm when the threshold is reached or exceeded.

The alarm may be triggered in various ways. It may comprise an alphanumeric display or an audible and/or visible warning situated on the towing pin itself, which is then provided with appropriate indicator means, and/or on the dashboard of the towing vehicle, and/or on the instrument panel in the aircraft cockpit, by appropriate data relays between the pin and the towing vehicle and/or between the pin and the aircraft. The alarm may be an electrical alarm, or any other triggering of a signal that requires action on the part of an operator or that acts on an operating parameter of the aircraft or of the towing vehicle.

It should be observed that the measurement and force comparator means 11 may include memories in order to keep a record of the measured forces that have exceeded the calculated thresholds.

The invention thus makes it possible, in real time, to determine the exact load that can be supported by the undercarriage as a function of the orientation of its wheels, and to trigger an alarm appropriately when that threshold is reached or exceeded. Using the orientation of the pin 8 in order to deduce therefrom the orientation of the wheels of the undercarriage, and using the load threshold of the same pin in order to deduce the load threshold of the undercarriage is advantageous since it is easier to fit instruments to a towing pin 8, which remains on the ground, than to the undercarriage 1 itself.

Naturally, the method of the invention may also be implemented by angle measurement means, calculation means, and comparator means that are not grouped together, or that are not all grouped together on the towing pin 8. At least some of these means may thus be incorporated in the calculation and control means already available in the aircraft.

Furthermore, it is also possible to provide the pin 8 with one or more prestress zones so that it breaks in those zones above a given load threshold, as is already done with towing pins, but with the present invention the threshold may be arranged to be higher.

What is claimed is:

1. A pin for coupling a tow bar to a steerable bottom portion of an undercarriage having a pivot axis that is inclined relative to the vertical, wherein the pin comprises:
   means for measuring the forces to which the pin is subjected;
   means for measuring the angle of inclination of the pin relative to the horizontal;
   means for calculating a force threshold as a function of the orientation of the bottom portion of the undercarriage as deduced from the angle of inclination of the pin; and
   means for comparing a measured force with the force threshold and for generating an alarm if the measured forces reach or exceed a force threshold.

2. A pin according to claim 1, wherein the means for measuring the angle of inclination of the pin relative to the horizontal comprise an accelerometer.

3. A method of protecting an aircraft undercarriage having a pivot axis that is inclined relative to the vertical, while the undercarriage is being towed by means of a tow bar hitched to the steerable bottom portion of the undercarriage, the method including the step of using a pin according to claim 1 in order to generate an alarm when a towing force imposed by the tow bar on the undercarriage reaches or exceeds a predetermined force threshold.

4. A method according to claim 3, wherein said threshold is caused to vary as a function of the orientation of the steerable bottom portion of the undercarriage.

5. A method according to claim 3, wherein the alarm is an alphanumeric display or an audible and/or visible warning.

6. A pin according to claim 2, wherein the accelerometer is a three-axis accelerometer.

7. A method of protecting an aircraft undercarriage having a pivot axis that is inclined relative to the vertical, while the undercarriage is being towed by means of a tow bar hitched to the steerable bottom portion of the undercarriage, the method including the step of using a pin according to claim 2 in order to generate an alarm when a towing force imposed by the tow bar on the undercarriage reaches or exceeds a predetermined force threshold.

8. A method of protecting an aircraft undercarriage having a pivot axis that is inclined relative to the vertical, while the undercarriage is being towed by means of a tow bar hitched to the steerable bottom portion of the undercarriage, the method including the step of using a pin according to claim 6 in order to generate an alarm when a towing force imposed by the tow bar on the undercarriage reaches or exceeds a predetermined force threshold.

9. A method according to claim 7, wherein said threshold is caused to vary as a function of the orientation of the steerable bottom portion of the undercarriage.

10. A method according to claim 8, wherein said threshold is caused to vary as a function of the orientation of the steerable bottom portion of the undercarriage.

11. A method according to claim 7, wherein the alarm is an alphanumeric display or an audible and/or visible warning.

12. A method according to claim 8, wherein the alarm is an alphanumeric display or an audible and/or visible warning.

* * * * *